United States Patent Office 3,520,924
Patented July 21, 1970

3,520,924
BIS-THIOSEMICARBAZONES
Erhardt Winkelmann, Kelkheim, Taunus, and Wolf-Helmut Wagner, Frankfurt am Main, Germany, assignors to Farbwerke Hoechst Aktiengesellschaft vormals Meister Lucius & Bruning, Frankfurt am Main, Germany, a corporation of Germany
No Drawing. Filed May 1, 1967, Ser. No. 634,872
Claims priority, application Germany, May 14, 1966, F 49,209
The portion of the term of the patent subsequent to Nov. 11, 1986, has been disclaimed
Int. Cl. C07c 157/00
U.S. Cl. 260—552        3 Claims

ABSTRACT OF THE DISCLOSURE

Bis-thiosemicarbazones, active against coccidiosis, having the formula

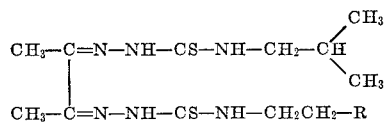

wherein R is dimethylamino or diethylamino and methods for making these compounds are described.

---

It has already been proposed to prepare basically substituted bis-4-alkyl-thiosemicarbazones of diacetyl of the general formula

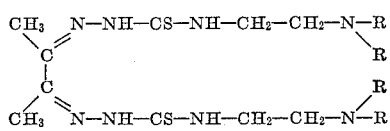

in which R represents the methyl or ethyl radical, or the group NRR taken as a whole represents the pyrrolidino, piperidino or the 2-methyl-piperidino group. These compounds are active against poultry coccidiosis in vivo (Eimeria tenella) as has been stated subsequently in Nature, vol. 206, 1340 (1965).

It has been found that special unsymmetric, unilaterally basically substituted bis-thiosemicarbazones have a surprisingly greater chemo-therapeutical breadth and are, therefore, extremely suitable for use against poultry coccidiosis.

Therefore, the present application relates to unilaterally basically substituted bis-thiosemicarbazones of the Formula I

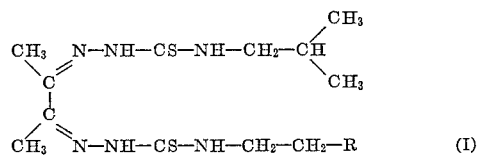

in which R represents a dimethylamino or a diethylamino group. These compounds are manufactured by processes in which (a) a mono-thiosemicarbazone of the Formula II

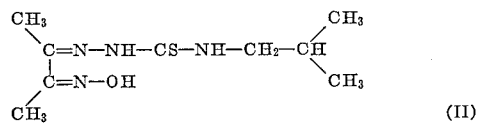

is reacted with a thiosemicarbazide of Formula III $$H_2N-NH-CS-NH-CH_2-CH_2-R \quad (III);$$

or a mono-thiosemicarbazone of the Formula IV

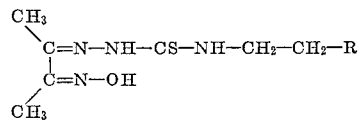

is reacted with a thiosemicarbazide of the Formula V

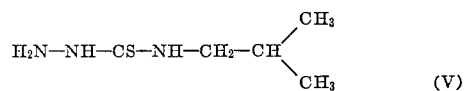

if desired, in the presence of acids; or (b) a mono-thiosemicarbazone of the Formula VI

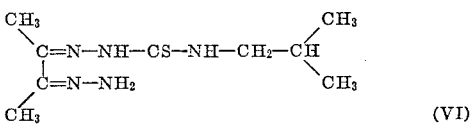

is reacted with mustard oil of the Formula VII $$S=C=N-CH_2-CH_2-R \quad (VII);$$

or a mono-thiosemicarbazone of the Formula VIII

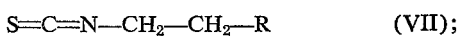

is reacted with a mustard oil of the Formula IX

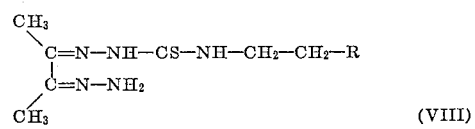

in which R has the meaning given above. If desired, bases may be isolated in a conventional manner from the salts obtained, or bases obtained are treated with acids.

Substituted bis-thiosemicarbazones of diketones are already known from Austrian Pat. No. 225,715 as well as from Nature, vol. 206, p. 1340 ff (1965).

The two products of the present invention have hitherto, however, not been described. Unsymmetrical, unilaterally basically substituted diacetyl bis-thiosemicarbazones have not been known until now.

The special advantage of the products of the present invention is they are extremely suitable for routine-prophylaxis of poultry coccidiosis because of their advantageous properties (low toxicity). This is not the case with the hitherto known basically substituted bis-thiosemicarbazones (cf. Nature, vol. 206, p. 1340 right column, lines 30–34).

The mustard oils or the thiosemicarbazides used as starting substances are: isobutyl mustard oil and isobutyl thiosemicarbazide as well as dimethylamino- and diethylamino-ethyl-mustard oil and the corresponding thiosemicarbazides.

The mustard oils are prepared in usual manner from the amines by reacting with carbon disulfide and subsequently oxydizing the dithiocarbamates formed during the first step with sodium chlorite (NaClO₂). The corresponding thiosemicarbazides are also obtained in known manner by reacting the mustard oils with molar amounts of hydrazine-hydrate at low temperatures.

The mono-thiosemicarbazone-mono-oximes of Formula II used as starting substances according to (a) can be prepared for example by reacting equimolar amounts of isonitroso-methylethylketone and thiosemicarbazides of Formula V. The reaction of the isonitroso-methylethylketone with the thiosemicarbazide of Formula V is carried out advantageously at room temperature in order to avoid a double reaction of the thiosemicarbazide to form the symmetrical bis-thiosemicarbazone.

The mono-thiosemicarbazone-mono-oximes of Formula II used as starting substances according to (a) can, furthermore, be prepared by reacting equimolar amounts of a mustard oil of Formula IX with diacetyl-mono-hydrazone-mono-oximes.

The mono-thiosemicarbazone-mono-oxime thus obtained is reacted with 1 mole of the thiosemicarbazide of the Formula III to give the bis-thiosemicarbazone (I) according to the process of the present invention (a). When reacting, it is advantageous to use, generally, a solvent or a dispersing agent. Preferably, the reaction is carried out in a five-fold to twenty-fold amount of an organic solvent, especially of a low molecular weight alcohol such as methanol, ethanol, propanol, isopropanol, butanol, isobutanol, methoxyethanol or ethoxyethanol. The reaction of the thiosemicarbazide of Formula III with the mono-oxime of Formula II can be carried out between room temperature and the boiling point of the solvent used, advantageously at 60–90° C. The reaction period may range from 15 minutes to several hours depending on the conditions and temperatures.

The preparation of the products of the invention is carried out correspondingly by starting from the mono-thiosemicarbazone of Formula IV, prepared from iso-nitroso-methylethylketone and a thiosemicarbazide of Formula III or from diacetyl-mono-hydrazone-mono-oxime and mustard oil of Formula VII, and reacting it with a thiosemicarbazide of Formula V in the manner described above.

Condensation can be carried out without using a catalyst but the presence of catalytic amounts of an acid is of great advantage, as otherwise the condensation reaction is carried out much more slowly and incompletely. As acids can be used: lower fatty acids such as formic acid or acetic acid, or mineral acids such as sulfuric acid, phosphoric acid, and hydrogen halides, preferably hydrochloric acid. If basically substituted thiosemicarbazides are reacted, molar amounts of acids are used for neutralisation: even a further small excess of acid is sufficient to promote condensation in excellent yields. The hydrochloric acid can be used in alcoholic or aqueous solution in optional concentrations. Because of the good solubility of the hydrochloride salts precipitated according to the invention, it is advantageous to use ½ concentrated or concentrated hydrochloric acid. The hydrochloric acid can be added after combination of the reaction components, but it is, however, advantageously added directly to the solution or suspension of the thiosemicarbazide. Generally, the desired products of the invention crystallize after a few minutes as di-hydrochlorides in pure form and can be recrystallized, if desired, from appropriate solvents such as aqueous alcohols.

The mono-thiosemicarbazone-mono-hydrazones of Formula VI used for the process of the present invention can be prepared by reacting 1 mole of a mustard oil of Formula IX with 1 mole of diacetyl-dihydrozone.

The reaction of the mono-hydrazone of Formula VI formed during this process with the mustard oil of Formula VII according to (b) can be carried out simply by heating the components, but it is generally advantageous also to use a solvent or a dispersing agent as it has been described under (a).

The mono-thiosemicarbazone reagent of Formula VIII, prepared from diacetyl-dihydrazone and a mustard oil of the Formula VII, is reacted in analogous fashion with a mustard oil of Formula IX.

The reaction periods may range between a few minutes and several hours depending on the conditions and temperatures. The reaction can be carried out advantageously by reacting the mustard oils IX and VII with diacetyl-dihydrazone one after the other, if desired, without isolation of the mono-thiosemicarbazone-mono-hydrazones VI or VIII. The process is carried out, for example, by dissolving diacetyl-dihydrazone, with heating, in a 20-fold amount of an alcohol and adding dropwise, while refluxing on a steam bath, an equimolar amount of mustard oil dissolved in alcohol. The mono-thiosemicarbazone-mono-hydrazone often crystallizes while warm. It can be isolated by filtration with suction and submitted directly to further reaction. Further reaction is carried out by dissolving the mono-thiosemicarbazone by heating in an appropriate alcohol, adding an equimolar amount of the second mustard oil, and heating on a steam bath for 1–2 hours depending on the reactive action of the mustard oil. The product of the invention desired crystallizes in most cases when the reaction mixture is cooled or when the reaction solution is concentrated and can be clarified, if desired, by recrystallization from an appropriate solvent, for example ethanol. The isolation of the product of the invention can also be carried out by transforming it into an acid addition salt, for example into a hydrochloride.

The new products of the invention can be used as medicaments. They are especially suitable for the therapy and prophylaxis of poultry coccidiosis because of their favorable chemotherapeutical index, and can be added to animal food. The post-mortem result following index of Tables 1 (activity) and 2 (toxicity) shows the superiority of the products of invention I and II in comparison with an unsymmetrical compound (III) having a similar structure and the symmetrically and basically substituted bis-thiosemicarbazone IV.

As reported in Tables 1 and 2, the therapeutic action of the substances was tested on coccidiosis-infected chickens in a food test. Their tolerance was tested in a drinking water test.

The prophylactic food tests were carried out by infecting each of a large number of few-day-old chickens (White Leghorn) with 100,000 spored oocysts of *Eimeria tenella* via the esophageal sound. The equally-infected animals were divided into groups of at most 10 chickens. These groups were all either treated for the time shown in the table or served as non-treated control groups. The infection was such that all infected control animals died with cecum coccidiosis within the test period. These results are not shown separately in the table.

For the prophylaxis and therapy of coccidiosis the substances are advantageously mixed with a solid, inert, and well tolerable mass in which they are homogeneously dispersed, preferably by means of a mixing device. Preferably, the active substances are added to the food, and the whole is fed to the animals. In order to obtain a good and equal distribution, it is suitable to prepare a pre-mix in which the active substances are concentrated to a large extent. Usually concentrations of 10–50%, preferably 25% are used. As carriers inorganic or organic physiologically tolerable products such as potassium carbonate, flour of different cereals, or dry mycelium from antibiotic fermentation can be used. Wheat middlings are especially advantageous for this purpose. Other substances which are important for animal nutrition such as antibiotics or vitamins can also be added. Such a pre-mix is then mixed with chicken feed so that a food mixture with an equally distributed content of active substances of 0.001–0.1% is obtained. Exemplary of such a mixture is a foodstuff consisting of

| | Kg. |
|---|---|
| Cod-fish meal | 3.500 |
| Soybean meal | 9.000 |
| Barley meal | 2.500 |
| Corn meal | 20.750 |
| Wheat meal | 10.000 |
| Wheat bran | 2.500 |
| Calcium phosphate | 0.500 |
| Calcium carbonate | 0.500 |
| Mixture of vitamins and mineral salts | 0.500 |

The test animals were fed the corresponding food mixtures for a few days before the infection. The infected test animal obtained the food without the active substance. The test was carried out for 2 weeks.

During the test the animals were examined for occyst secretion and it was found whether the deaths occurring were caused by coccidiosis or for other reasons. At the end of the test, an autopsy of the animal which survived was carried out and the degree of the infection was determined, which was expressed in numerical values of 0–8. The values on the tables are meant to be the average value of the respective number of animals.

The tolerance tests in Table 2 were carried out by administering the substances, in admixture with drinking water, to non-infected animals in the same manner. The drinking water containing the preparation was at the animals' disposal for 5 days under these test conditions. The chickens used for the tolerance test belonged to the same species as those used for the prophylactical tests.

The total test period amounted almost to 3 weeks so that the observation period was long enough. The first administration of the drinking water containing the preparation was carried out at the beginning of this test period. The rates of survival given in the tables were determined at the end of the three weeks' observation period.

Compounds compared:

I diacetyl-mono-isobutyl-thiosemicarbazone-mono-(2-dimethylaminoethyl-thiosemicarbazone) (cf. Example 1)

II diacetyl-mono-isobutyl-thiosemicarbazone-mono-(2-diethylaminoethyl-thiosemicarbazone) (cf. Example 2)

III diacetyl-mono-isobutyl-thiosemicarbazone-mono-(2-morpholinoethyl-thiosemicarbazone)=unsymmetrical compound having similar structure

IV diacetyl-bis-(2-dimethylaminoethyl-thiosemicarbazone) =symmetrical compound having similar structure (cf. Nature, vol. 206, p. 1340 (1965).

TABLE 1.—COCCIDIOSIS ACTIVITY (INFECTED ANIMALS)

| Preparation | Period of administration in days | Dose in the animal food in g./kg. | Survival/ total | Post mortem result index 0-8 |
|---|---|---|---|---|
| Test animals | | | 0/10 | |
| I | 10 | 0.01 | 10/10 | 1.3 |
| II | 10 | 0.01 | 10/10 | 1.2 |
| III | 10 | 0.01 | 4/10 | 5.3 |
| IV | 10 | 0.01 | 10/10 | 5.2 |

TABLE 2.—NON-INFECTED ANIMALS

| Preparation | Period of administration in days | Concentration in drinking water in percent | Survival/total |
|---|---|---|---|
| I | 5 | 0.03 | 10/10 |
| II | 5 | 0.03 | 10/10 |
| IV | 5 | 0.03 | 0/10 |

For the toxicity test in drinking water compounds I, II and IV were used in a hydrochloric acid solution.

The following examples serve to illustrate the invention but they are not intended to limit it thereto.

EXAMPLE 1

Diacetyl-mono-isobutyl-thiosemicarbazone-mono-(2-dimethylaminoethyl-thiosemicarbazone)

24.4 grams (0.1 mol) of diacetyl-mono-(2-dimethylaminoethyl-thiosemicarbazone)-monohydrazone are dissolved in 90 cc. of ethanol by heating and 11.5 grams (0.1 mol) of isobutyl-mustard oil are added and the whole is heated under reflux in a steam bath for 3 hours. After cooling, the final product crystallizes. It is filtered off with suction, recrystallized from alcohol, filtered off with suction, washed with cold ethanol and ether and dried on a steam bath. 26.2 grams=73% of the theory of diacetyl-mono-isobutyl-thiosemicarbazone-mono-(2-dimethylaminoethyl-thiosemicarbozone) are obtained as yellowish, crystalline powder (melting point 219° C., with decomposition).

$C_{14}H_{29}N_7S_2$ (percent) (molecular weight 359)— Cal.: N, 27.3; S, 17.9. Found (percent): N, 27.5; S, 18.1.

The diacetyl-mono-(2-dimethyl-aminoethyl - thiosemicarbazone)-monohydrazone used as starting substance was prepared by adding a solution of 13.0 grams (0.1 mol) of 2-dimethylaminoethyl-mustard oil (boiling point of 82–85° C. under a pressure of 12 mm. of mercury and melting point of 34–36° C.) in 25 cc. of ethanol dropwise, over a period of about 1 hour, to a boiling solution of 11.4 grams (0.1 mol) diacetyl-dihydrazone (melting point 164° C.) in 150 cc. of ethanol. After addition is terminated the whole is boiled under reflux for 15 minutes. The solution is evaporated under reduced pressure to a quarter of its total volume and the desired product is separated by adding ether. It is filtered off with suction, washed with ether and dried in an dessicator. 16.6 grams=68% of the theory of diacetyl-mono-(2-dimethylamino-ethylthiosemicarbazone) - mono-hydrazone are obtained as yellowish powder (melting point 132–134° C.).

EXAMPLE 2

Diacetyl - mono - isobutyl - thiosemicarbazone - mono- (2-diethylaminoethyl-thiosemicarbazone)

27.2 grams (0.1 mol) of diacetyl-mono-(2-diethylaminoethylthiosemicarbazone)-mono-hydrazone are dissolved in 90 cc. of ethanol by heating and 11.5 grams (0.1 mol) of isobutyl-mustard oil are added and the whole is heated under reflux on a steam bath for 3 hours. After cooling, the final product crystallizes. It is filtered off with suction, recrystallized from alcohol, filtered off with suction, washed with cold ethanol and ether and dried in a steam bath. 27.0 grams (=70% of the theory) of diacetyl-mono-isobutyl - thiosemicarbazone - mono - (2 - diethylaminoethyl-thiosemicarbazone) are obtained as yellowish, crystalline powder (melting point 212° C.), with decomposition.

$C_{16}H_{33}N_7S_2$ (percent) (molecular weight 387)— Cal.: N, 25.3; S, 16.6. Found (percent): N, 25.2; S. 16.8.

The diacetyl-mono-(2 - diethylaminoethyl - thiosemicarbazone)-mono-hydrazone used as starting substance was prepared by adding a solution of 15.8 grams (0.1 mol) of 2-diethylaminoethyl-mustard oil (boiling point 70–72° C. under a pressure of 2 mm. of mercury) in 25 cc. of ethanol dropwise, over a period of about 30 minutes to a boiling solution of 11.4 grams (0.1 mol) of diacetyl-dihydrazone (melting point 164° C.) in 150 cc. of ethanol. After addition is terminated, the whole is boiled under reflux for 15 minutes. The solution is evaporated under reduced pressure to a quarter of its total volume and the desired product is separated by adding petroleum ether. It is filtered off with suction, washed with petroleum ether and dried in dessicator. 20 grams (=73% of the theory) of diacetyl-mono-(2 - diethylaminoethyl - thiosemicarbazone)-mono-hydrazone are obtained as yellowish crystalline powder (melting point 115–117° C.).

The diacetyl-mono-(2 - diethylaminoethyl - thiosemicarbazone)-mono hydrazone used as starting compound can also be prepared by boiling a solution of 11.5 grams (0.1 mol) of diacetpl-mono-hydrazone-mono-oxime in 50 cc. of ethanol for 2 hours with 19.0 grams (0.1 mol) of 2-diacetyl-aminoethyl - thiosemicarbazide (melting point 85–87° C.) in 70 cc. of ethanol and 22 cc. of aqueous concentrated hydrochloric acid. After cooling of the reaction solution, the compound is separated by adding dilute ammonia in portion to a pH of 7.5. It is filtered off with suction, washed with water, cold ethanol and ether and dried. Yield: 70% of the theory, melting point 117° C.

We claim:
1. A bis-thiosemicarbazone of the formula

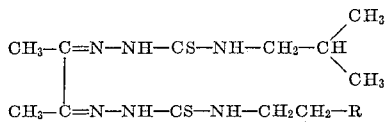

wherein R is dimethylamino or diethylamino.

2. A compound as in claim 1 wherein R is dimethylamino.

3. A compound as in claim 1 wherein R is diethylamino.

FOREIGN PATENTS 1,298,323   6/1962   France.

OTHER REFERENCES

Bernstein et al. J. Am. Chem. Soc. vol. 73, March 1951, pp. 906–912.

Pulvermacher, Berichte, vol. 27, (1894) pp. 615–625.

LEON ZITVER, Primary Examiner

M. W. GLYNN, Assistant Examiner

U.S. Cl. X.R.

424—323; 260—999, 566